United States Patent [19]

Byrne

[11] 4,184,335
[45] Jan. 22, 1980

[54] WAVE MOTOR TANK

[76] Inventor: Irvin J. Byrne, 3200 NW. 79th St., Apt. H811, Miami, Fla. 33147

[21] Appl. No.: 885,531

[22] Filed: Mar. 13, 1978

[51] Int. Cl.² ............................................. F03B 13/12
[52] U.S. Cl. .......................................... 60/496; 60/507
[58] Field of Search ................. 60/495, 496, 497, 507; 417/331, 333, 337; 290/53

[56] References Cited

U.S. PATENT DOCUMENTS

| 2,470,313 | 5/1949 | Levin | 60/496 |
| 2,935,024 | 5/1960 | Kofahl | 60/496 |

Primary Examiner—Allen M. Ostrager
Attorney, Agent, or Firm—Robert D. Farkas

[57] ABSTRACT

An improved wave motor tank utilizes a tank having an open mouth portion disposed in a downwardmost position when residing in a body of water experiencing the effects of waves and tides. The tank is coupled to a mechanical apparatus, well known in the art, utilized in extracting energy due to the fall and rise of the tank. The interior of the tank is subjected to a negative pressure so as to tightly couple the tank to the water in which it is caused to reside. The tank is provided with a flotation chamber which contains a gas thereon, offsetting the weight of the tank and any ballast attached thereto, maintaining such tank at a near weightless condition yet effectively "clamped" to the surrounding water.

8 Claims, 3 Drawing Figures

U.S. Patent
Jan. 22, 1980
4,184,335
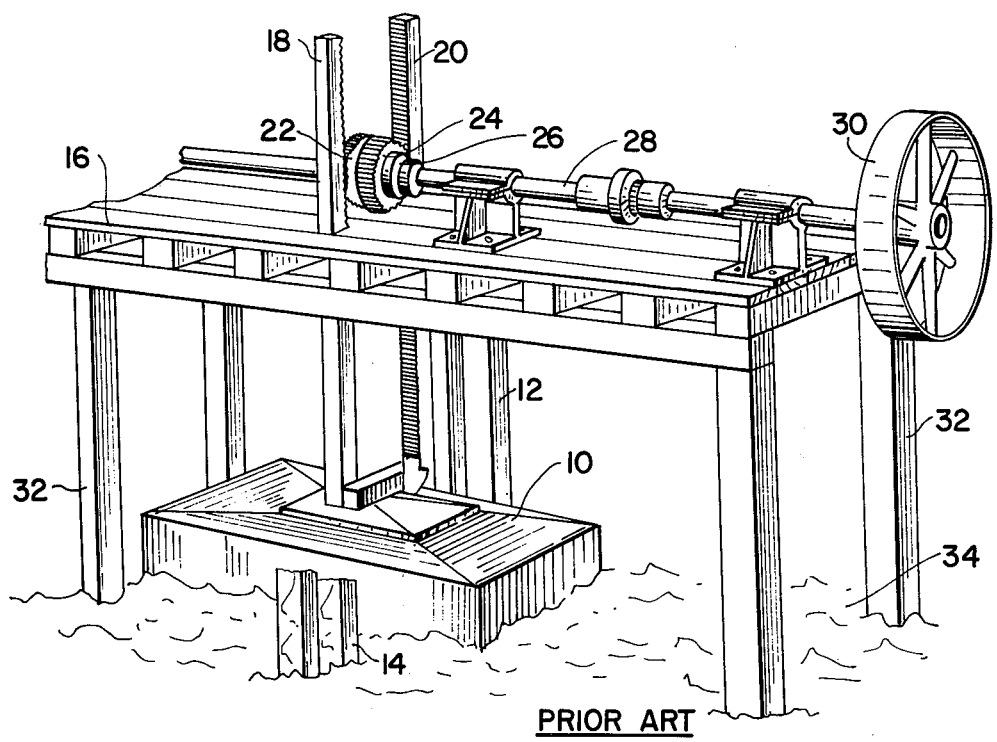
PRIOR ART
FIG. 1
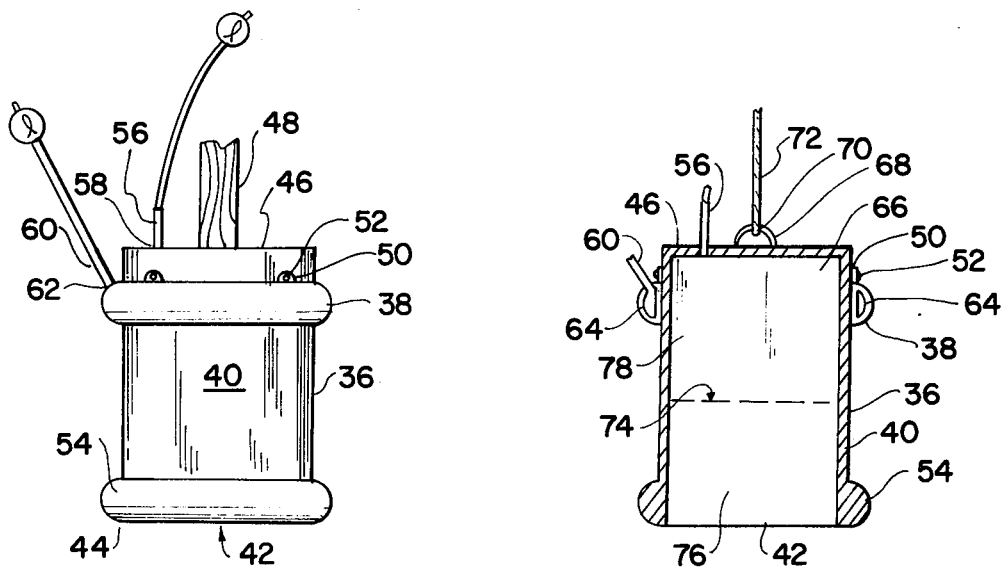
FIG. 2
FIG. 3

WAVE MOTOR TANK

BACKGROUND OF THE INVENTION

1. The Field of the Invention

This invention relates to improvements in wave motor tanks and more particularly to that class of wave motor tank which is useful at extracting energy from tidal and wave motion of large bodies of water due to the rise and fall thereof.

2. Description of the Prior Art

The prior art abounds with wave motor apparatuses, a major class of which utilizing reciprocally operating tanks which are buoyantly supported by a body of water. Such tanks frequently require vertical guidance and utilize cables, chains or rigid members, which when coupled to the tank, transmit a force therealong due to the displacement of such tank when the tank shifts its position in response to wave motion and the tides. Typical of such a wave motor, is the apparatus taught in U.S. Pat. No. 884,080 issued Apr. 7, 1908, to G. T. Fallis. Fallis discloses a buoyant sealed tank having a pair of racks upstanding therefrom, which is vertically guided and allowed to rest in and on a body of water. A platform is provided, having supporting columns anchored in the soil beneath the body of water. The columns pass through openings in the platform and each engage a pair of pinion gears, carried on a common shaft, each pinion is mounted on a separate one-way clutch such that the shaft is caused to rotate in one direction at all times, responsive to the buoyant forces directing the tank in an upward direction as the tide comes in, for example, and responsive to the weight of the tank when the tide goes out. Similarly, swells and wave motion further cause the output shaft to rotate in the same direction due to the waves' effect upon the tank. The output shaft is provided with a pulley for purposes of coupling such shaft to an electric generator or the like. Unfortunately, the forces transmitted to the output shaft, when the tank is moving in an upward direction, are limited to a force equivalent to the net buoyancy of the tank. When the tank descends, as when the tide or waves permit same, the only force transmitted to the pair of racks thereof is a downward force of the same magnitude as the upward force. This is so because the weight of the tank must always be slightly less than the buoyant forces exerted thereon. Since it is presumed that the tank is always in contact with the water, the buoyant forces are always at work. Thus, the torque transmitted to the output shaft, regardless of direction taken by the Fallis tank is proportional to the difference between the buoyant forces exerted on the tank less the weight thereof. Friction, induced by the vertical posts providing vertical guidance for the tank, further diminishes the efficiency of the system. Such vertical posts are required because the Fallis tank is susceptible to horizontal motion of the water about the tank which tends not only to displace the tank laterally but tends, more importantly, to shift the line of motion of the tank away from the vertical.

U.S. Pat. No. 3,894,241 issued July 8, 1975 to S. Kaplan discloses a power source which is powered by the energy in water waves that has a frame which supports a shaft above the waves. A large number of floats are constrained by the frame to be moved up and down under the shaft by the waves. Above each float a first pulley having a first releasable ratchet and a non-releasable ratchet has a chain pass over it to hold a first weight at one end. On each float there is mounted a second pulley which engages the other end of the chain, the second pulley having a second releasable ratchet. Each chain passes through a passage in the float to terminate a second lighter weight. As waves move each float up, a second releasable ratchet allows its second pulley to turn. As each float moves down, it pulls a chain about a first pulley raising a first weight, a first releasable ratchet allowing its first pulley to turn and a non-releasable ratchet allowing it to turn without rotating the shaft. As each first weight reaches a desired height, a means releases both releasable ratchets to drop each first weight to turn the shaft by means of the first pulley and the non-releasable ratchet. Sufficient floats and associated weights and apparatus insure that the shaft will be constantly turning by falling weights to provide a power source. Each of the floats are maintained in a vertical guidance system and each provides a turning force to the shaft utilizing the chains therefor. The Kaplan apparatus requires that the total weight of the float must be greater than the difference between the individual weights associated therewith. In this manner, when a large number of floats are employed, at least one of the weights will always be falling so as to provide a constant power output to the shaft. The Kaplan apparatus teaches a mechanism which is effective in providing a turning force to the output shaft which is best suited for use with a float which cannot descend as rapidly as the water in the region adjacent thereto. Obviously, when the floats utilized by Kaplan are made sufficiently large, such floats will respond to wave and tide actions and reside in the water at all times. This effectively removes the advantage of the Kaplan apparatus such that the net force applied to the Kaplan chain when the float operating such chain moves in the downward direction is equivalent to the difference between the weight of the float and the buoyant forces of the water always contacting same.

SUMMARY OF THE INVENTION

A primary object of the present invention is to provide an improved wave motor tank which is effectively locked to a body of water regardless of the size of the tank employed.

Another object of the present invention is to provide an improved tank for use in wave motors which tends to maintain itself in an upright position at all times.

Still another object of the present invention is to provide a wave motor tank which couples a greater force to a rotating shaft thereabove when such tank is moving in a downward direction than tanks of a conventional construction.

Yet another object of the present invention is to provide an improved wave motor tank which has an effective specific gravity of zero when disposed in a "floating" position in a body of water.

A further object of the present invention is to provide an improved floatation tank which may be easily and effectively transported from place to place, ossessing a low weight.

Another object of the present invention is to provide a floatation tank for wave motors which increases the efficiency of converting water motion to a suitable form of energy derived therefrom over existing floatation tanks.

Prior art floatation tanks, of any size, had to be constructed such that the tank possesses sufficient strength to maintain the tank in floatable condition whilst allowing the tank to be buffeted by the action of waves and tides of the water supporting same. Forgetting the mechanical constraints requiring such tanks to maintain their physical integrity during the buffeting that they receive in such environment, the tank efficiency is measured in terms of, in the main, the weight of the tank, an important consideration for manufacturing and transportation, the buoyancy of the tank, an important consideration in terms of the forces generated by such tank when rising and falling with the water supporting same and the overall size and form factor of the tank, an important consideration when designing a tank so as to optimize its use in varying locations responsive to local tide and wave conditions thereat. Also of importance is the need to provide vertical support columns so as to guide the tank in a constrained area whilst allowing such tanks to rise and fall in place. The present invention recognizes these parameters and provides a ready solution thereto in a most effective manner. A tank, of any size, may be constructed as an effective weight much greater than the actual weight thus allowing the improved tank to more nearly follow the undulations of the water supporting it. Yet, the improved tank is permitted to move upwardly as if its net buoyancy is much greater than the actual buoyant forces exerted thereon, tending to maintain the improved tank in a floated condition. Since the improved tank is "clamped" to a given body of water and since the improved tank experiences the effective weight of a much heavier tank, the improved tank tends to require less vertical guidance than prior art tanks. This is accomplished by utilizing an inverted open mount container, of any convenient size or shape, having a rigid or flexible member affixed to the uppermost regions thereof for use in communicating the force generated by the tank motion in an upward and downward position. A negative pressure is caused to be experienced in the upper closed end region of the tank, utilizing a flexible hose coupled to a vacuum pump, if desired therefor. A floatation collar or sealed chamber of any desired type is secured to, or made integral with, the container at a location adjacent the uppermost regions thereof. If desired, additional weighted portions may be secured to the lowermost regions further tending to maintain the improved tank in an upright position. The negative pressure within the tank, causes water to enter the tank in the lowermost regions thereof across the open mouth portion and to be maintained therein so as to effectively "clamp" the tank to the water. A judicial balance between the size of the floatation chamber and the weight of the tank and its added supplemental weights, if used, can be struck so as to maintain the tank in an almost weightless condition if desired. Thus, the tank may be adjusted so as to move upwardly and downwardly, expressing moderate forces on the shaft or cable coupled thereto, or, if desired, may communicate great forces upon increasing the negative pressure so as to exert a great downward force, much greater than the actual weight of the tank, when the water level descends. Since the force of the negative pressure is exerted on a broad area, equivalent to the open mouth portion of say, a cylindrical tank, such downward force may be massive indeed. As long as the tank is maintained in a near upright condition, this force is directed downwardly in a vertical line. The floatation collar or buoyancy void or compartment must be of sufficient size so as to provide a buoyant force to the improved tank, maintaining same in a floating condition. As long a such buoyant force is slightly greater than the weight of the improved tank and the force exerted by the negative pressure or vacuum therewithin, the improved tank will float. However, any attempt to move the improved tank upwardly relative to the surface of the water contained within the tank will be resisted by the product of the negative pressure times the surface area of the cross section of the interior tank at the intersection of the surface of the water therein and the vacuumized interior thereover. Thus, the tank, if effectively "clamped" in a most efficient manner to the water supporting same, will result in increased efficiency in a wave motor operation. If desired, the floatation collar or floatation chamber may be coupled to a source of compressed air, utilizing a flexible hose therefor.

These objects as well as other objects of the present invention will become more readily apparent after reading the following description of the accompanying drawings.

BRIEF DESCRIPTION OF THE DRAWINGS

FIG. 1 is a perspective view of an apparatus, well known in the prior art, utilizing a floatation tank.

FIG. 2 is a side elevation view of the present invention.

FIG. 3 is a side elevation, cross-sectional view of the present invention shown having an alternate means of supporting same thereon.

DESCRIPTION OF THE PREFERRED EMBODIMENT

The structure and method of fabrication of the present invention is applicable to a hollow container, preferably fabricated from a plastic or metallic rugged material, such as polypropylene or steel, having an open mouth portion disposed in a lowermost position. Such container may be a hollow cylindrical tank having a cap at the uppermost end and an open mouth portion at the lowermost end. A first pipe communicates to the interior of the tank by passing through the cap portion thereof. Such pipe may be coupled to a source of negative pressure, such as a vacuum pump. Alternatively, if desired, a valve may be interposed at the top of the tank such that when negative pressure is induced in the tank after having the open mouth portion thereof immersed in a body of water, the pipe may be removed, maintaining the negative pressure in the uppermost regions of the tank. A floatation collar or compartment may be secured to the tank. In the preferred embodiment, a unitary waterproof floatation collar, resembling a donut-shaped hollow ring is secured, by any convenient means, to the exterior portions of the tank, preferably in the uppermost regions thereof. Such sealed donut-like shaped floatation collar may be positioned at preferred locations along the height of the tank or, may be supplanted by a plurality of rib-like compartments extending in annular-like fashion about the exterior surface of the tank. If desired, any and all of the floatation compartments or the floatation collar may be coupled to a source of compressed air which is used to maintain such collars full of air, providing buoyancy for the tank. Alternatively, a permanently sealed floatation collar may be employed. If additional weight is desired to maintain the tank in a more upright condition, weights may be secured within or without the tank, adjacent the lowermost regions thereof, so as to position the longitudinal axis of the tank along a vertical line, having the open mouth regions thereof residing in a horizontal plane when the tank is disposed in an operative condition within a body of water. A rigid post, rod or other member may be secured to the exterior of the tank for purposes of transmitting the forces exerted on the tank by the body of water supporting same, when such tank moves upwardly and downwardly. Alternatively, a flexible chain, rope or the like may be employed, having the lowermost regions thereof secured to an eye-bolt-like device, fastened to the exterior surface of the cap portion of the tank. The rigid member or the flexible rope-like member is coupled to any wave motor device useful in translating reciprocal motion into convenient forms of energy, well known in the art. Such device includes hydraulic pumps which in turn operate hydraulic motors driving electric generators, rotating shafts which in turn drive electric generators and the like.

Now referring to the figures, and more particularly to the prior art embodiment illustrated in FIG. 1 showing a floatation tank 10 shown guided by vertical posts 12 and 14. Such vertical posts are secured to platform 16. Racks 18 and 20 engage gears 22 and 24 respectively. Each of the gears utilize a one-way clutch, typified by clutch 26, in driving output shaft 28. Pulley 30 is utilized in providing output power to a belt, not shown. Vertical columns 32 provide vertical support to platform 16, when positioned over a body of water 34. Such prior art apparatus is disclosed in U.S. Pat. No. 884,080 issued Apr. 7, 1908 to G. T. Fallis. Floatation wave motor tank 10 moves upwardly and downwardly depending upon the height of water 34.

FIG. 2 illustrates a cylindrical tank 36, being an embodiment of the present invention. Floatation collar 38 is secured to the exterior surface 40 of cylindrical hollow tank 36. Open mouth portion 42 of the tank is disposed adjacent end 44 thereof, shown opposite to cap end 46. Rigid post or beam 48, shown attached to cap end 46, is the equivalent of one of the racks 18 or 20, shown in FIG. 1. Tab ears 50, secured to collar 38, utilize bolts 52 to secure collar 38 to surface 40. Bulbous portion 54 of tank 36, is shown located adjacent end 44 thereof. Hollow pipe 56 is secured to cap end 46 and has end 58 thereof communicating to the interior of tank 36. Hollow flexible pipe 60 is shown having end 62 thereof engaging collar 38, and communicates to the interior thereof.

FIG. 3 illustrates tank 36, shown having bulbous portion 54 thereof in a solid construction disposed adjacent open mouth portion 42. Interior 64, of floatation collar 38, is shown communicating to pipe 60 which is communicated to a source of compressed air, if desired. Alternatively, collar 64 may be sealed off, containing air therein for floatation purposes. Pipe 56 is shown communicating into the interior region 66 of tank 36. Eye-bolt-like device 68 is shown secured to cap end 46, having the lowermost end 70, of flexible line 72, secured thereto. Flexible line 72 is useful in coupling tank 36, shown in FIG. 3 to a wave motor apparatus, similar to the device shown in FIG. 1, by having the other end of flexible line 72 wrapped about output shaft 28, shown in FIG. 1. Dotted lines 74 simulate the uppermost level of water contained in region 76, in the interior of tank 36 when region 78 thereof experiences negative pressure. The cross-section of tank 36, at the location of dotted lines 74, determines the downward thrust due to the negative pressure of region 78. Obviously, the greater the negative pressure, or vacuum level, the greater such downward thrust.

One of the advantages of the present invention is an improved wave motor tank which is effectively locked to a body of water regardless of the size of the tank employed.

Another advantage of the present invention is an improved tank for use in wave motors which tends to maintain itself in an upright position at all times.

Still another advantage of the present invention is a wave motor tank which couples a greater force to a rotating shaft thereabove when such tank is moving in a downward direction than tanks of a conventional construction.

Yet another advantage of the present invention is an improved wave motor tank which has an effective specific gravity of zero when disposed in a "floating" position in a body of water.

A further advantage of the present invention is an improved floatation tank which may be easily and effectively transported from place to place, possessing a low weight.

Another advantage of the present invention is a floatation tank for wave motors which increases the efficiency of converting water motion to a suitable form of energy derived therefrom over existing floatation tanks.

Thus, there is disclosed in the above description and in the drawings, an embodiment of the invention which fully and effectively accomplishes the objects thereof. However, it will become apparent to those skilled in the art, how to make variations and modifications to the instant invention. Therefor, this invention is to be limited, not by the specific disclosure herein, but only by the appending claims.

The embodiment of the invention in which an exclusive privilege or property is claimed are defined as follows:

1. A wave motor apparatus comprising a floatation tank, means to couple the elevation of said tank to an energy gathering apparatus responsive to said elevation of said tank, the improvement comprising a hollow tank having an open mouth portion disposed only at one end thereof, the other end of said tank being closed, said means to couple being affixed to said other end of said tank, means to induce a negative pressure within the interior of said tank when said open mouth portion thereof is disposed below the surface of a body of water, means to provide a buoyant force to said tank when said tank is disposed residing in said body of water.

2. The apparatus as claimed in claim 1 further comprising means to maintain said other end of said tank above said open mouth portion thereof.

3. The apparatus as claimed in claim 2 wherein said means to maintain said other end of said tank comprises said one end of said tank having a region adjacent thereto having a greater mass than another region of said tank disposed intermediate said one end of said tank and said other end of said tank.

4. The apparatus as claimed in claim 1 wherein said means to induce said negative pressure comprises a first hollow pipe communicating to the interior of said tank, said first pipe being located adjacent said other end of said tank, the other end of said tank communicating with a source of negative pressure.

5. The apparatus as claimed in claim 1 wherein said means to provide a buoyant force to said tank comprises a hollow collar, said hollow collar secured to said tank, means to maintain a gas under pressure in said hollow collar.

6. The apparatus as claimed in claim 5 wherein said means to maintain a gas comprises an air compressor, said air compressor communicating to one end of a second pipe, the other end of said second pipe communicating to the interior of said collar.

7. The apparatus as claimed in claim 1 wherein said tank comprises a right angle cylinder.

8. The apparatus as claimed in claim 7 wherein said open mouth portion defines the interior of said cylinder.

* * * * *